(12) United States Patent
Irikuchi et al.

(10) Patent No.: US 8,213,777 B2
(45) Date of Patent: Jul. 3, 2012

(54) RECORDING/REPRODUCING APPARATUS AND METHOD, SIMULTANEOUS PROCESSING PROGRAM STORAGE MEDIUM, AND SIMULTANEOUS PROCESSING PROGRAM (75) Inventors: Hodaka Irikuchi, Tokyo (JP); Junji Oiwa, Kanagawa (JP)

(73) Assignee: Sony Corporation (JP)

( * ) Notice: Subject to any disclaimer, the term of this patent is extended or adjusted under 35 U.S.C. 154(b) by 1399 days.

(21) Appl. No.: 10/500,486

(22) PCT Filed: Oct. 28, 2003

(86) PCT No.: PCT/JP03/13775
§ 371 (c)(1),
(2), (4) Date: Mar. 11, 2005

(87) PCT Pub. No.: WO2004/040907
PCT Pub. Date: May 13, 2004

(65) Prior Publication Data
US 2005/0158029 A1 Jul. 21, 2005

(30) Foreign Application Priority Data
Oct. 31, 2002 (JP) .................................. 2002-318959

(51) Int. Cl.
*H04N 5/78* (2006.01)
(52) U.S. Cl. ....................................................... 386/326
(58) Field of Classification Search ...................... 386/83
See application file for complete search history.

(56) References Cited

U.S. PATENT DOCUMENTS
5,734,444 A   3/1998  Yoshinobu 6,405,372 B1 * 6/2002 Kim et al. ...................... 725/50
(Continued)

FOREIGN PATENT DOCUMENTS
GB          2 326 789 A      12/1998
(Continued)

OTHER PUBLICATIONS
European Search Report, EP 03758992, mailed Jun. 5, 2009.

*Primary Examiner* — William C Vaughn, Jr.
*Assistant Examiner* — Daniel Tekle
(74) *Attorney, Agent, or Firm* — Lerner, David, Littenberg, Krumholz & Mentlik, LLP (57) ABSTRACT

The present invention aims to certainly use an electronic program guide. According to the present invention, a switch circuit part 24 for connecting a first tuner 2 and a second tuners 3 that take in a television signal S2 on plural channels including a program guide providing channel and select one of them, to a first and a second signal processing systems 30 and 31 that perform predetermined processing to the television signal S2, and a VBI slicer 23 that extracts an electronic program guide from the television signal S2 on the program guide providing channel, is controlled so that the first and the second signal processing systems 30 and 31 that simultaneously perform predetermined different processing to the above one television signal S2, are collectively connected to one of the first tuner 2 and the second tuner 3. Thereby, even in the case where predetermined plural different processing is simultaneously performed to one television signal S2, the first or the second tuner 2 or 3 can be kept for selecting the program guide providing channel, and an electronic program guide can be certainly obtained. Thus, a recording/reproducing apparatus capable of certainly using an electronic program can be accomplished.

6 Claims, 6 Drawing Sheets

U.S. PATENT DOCUMENTS

| | | | |
|---|---|---|---|
| 6,784,940 B1 * | 8/2004 | Takazawa et al. | 348/388.1 |
| 2002/0092021 A1 * | 7/2002 | Yap et al. | 725/55 |
| 2002/0150382 A1 * | 10/2002 | Sasaki et al. | 386/68 |

FOREIGN PATENT DOCUMENTS

| | | | |
|---|---|---|---|
| JP | 8-180504 A | 7/1996 | |
| JP | 11-27593 A | 1/1999 | |
| JP | 11-46353 A | 2/1999 | |
| WO | 01/11865 A1 | 2/2001 | |

* cited by examiner

RECORDING/REPRODUCING APPARATUS AND METHOD, SIMULTANEOUS PROCESSING PROGRAM STORAGE MEDIUM, AND SIMULTANEOUS PROCESSING PROGRAM

TECHNICAL FIELD

The present invention relates to a recording/reproducing apparatus, and is suitably applied, for example, to a recording/reproducing apparatus for recording/reproducing a television signal on a desired channel, in television signals on plural channels.

BACKGROUND ART

A broadcast receiving apparatus being a conventional recording/reproducing apparatus has two tuners for receiving television signals on plural channels. One of the tuners is used to select a television signal on a desired channel for viewing and recording, and the other tuner is used to select the television signal on the desired channel for recording. (For example, see Patent Document 1.)

Japanese Patent Laid-Open No. 8-180504 (FIG. 1)

In recent years, in a recording/reproducing apparatus such as the above broadcast receiving apparatus, it has been considered that an electronic program guide included in a television signal, for example, on specified one of plural channels is extracted and used for recording reservation or the like.

In a broadcast receiving apparatus having such configuration, to extract the electronic program guide from the television signal on the specified channel, it is necessary to select the specified channel by either of the tuners according to that extraction.

In such broadcast receiving apparatus, two tuners can be simultaneously worked. Therefore, a television signal on the same channel will be selected by two tuners respectively, so that the television signal selected by one tuner will be used to view the television program, and at the same time, the television signal selected by the other tuner will be used to record the television program in a recording/reproducing apparatus part.

Therefore, in such broadcast receiving apparatus, in the case where the same channel different from the specified channel has been selected by both of two tuners to simultaneously perform the viewing and the recording of one television program, the tuners cannot be used to select the specified channel, so that the electronic program guide cannot be extracted. There has been a problem that it is difficult to use the electronic program guide for recording reservation or the like.

DESCRIPTION OF THE INVENTION

The present invention has been done considering the above point, and is proposing a recording/reproducing apparatus surely usable an electronic program guide.

To obviate such problem, according to the present invention, by at least two channel selecting mechanisms, television signals on plural channels including a television signal on a program guide providing channel, in that an electronic program guide has been stored at a predetermined timing, are taken in, and a television signal on a desired channel is selected. By at least two signal processing mechanisms, predetermined processing is performed to the television signal on the desired channel selected by the channel selecting mechanism, and by electronic program guide extracting mechanism, the electronic program guide is extracted from the television signal on the program guide providing channel selected by the channel selecting mechanism. When predetermined plural different processing is simultaneously performed to the above one television signal on the desired channel by each signal processing mechanism, control mechanism controls switching mechanism for switching connection of the channel selecting mechanisms to the signal processing mechanisms and electronic program guide extracting mechanism so that signal processing mechanisms are collectively connected to the above one of the plural channel selecting mechanisms.

Therefore, even in the case where predetermined plural different processing is simultaneously performed to one television signal, channel selecting mechanism can be kept to select the program guide providing channel, and the above kept one channel selecting mechanism is connected to the electronic program guide extracting mechanism via the switching mechanism, so that the electronic program guide can be certainly obtained from the television signal on the program guide providing channel.

BEST MODE FOR CARRYING OUT THE INVENTION

An embodiment of the present invention will be described in detail with reference to the accompanying drawings.

Figure 1:
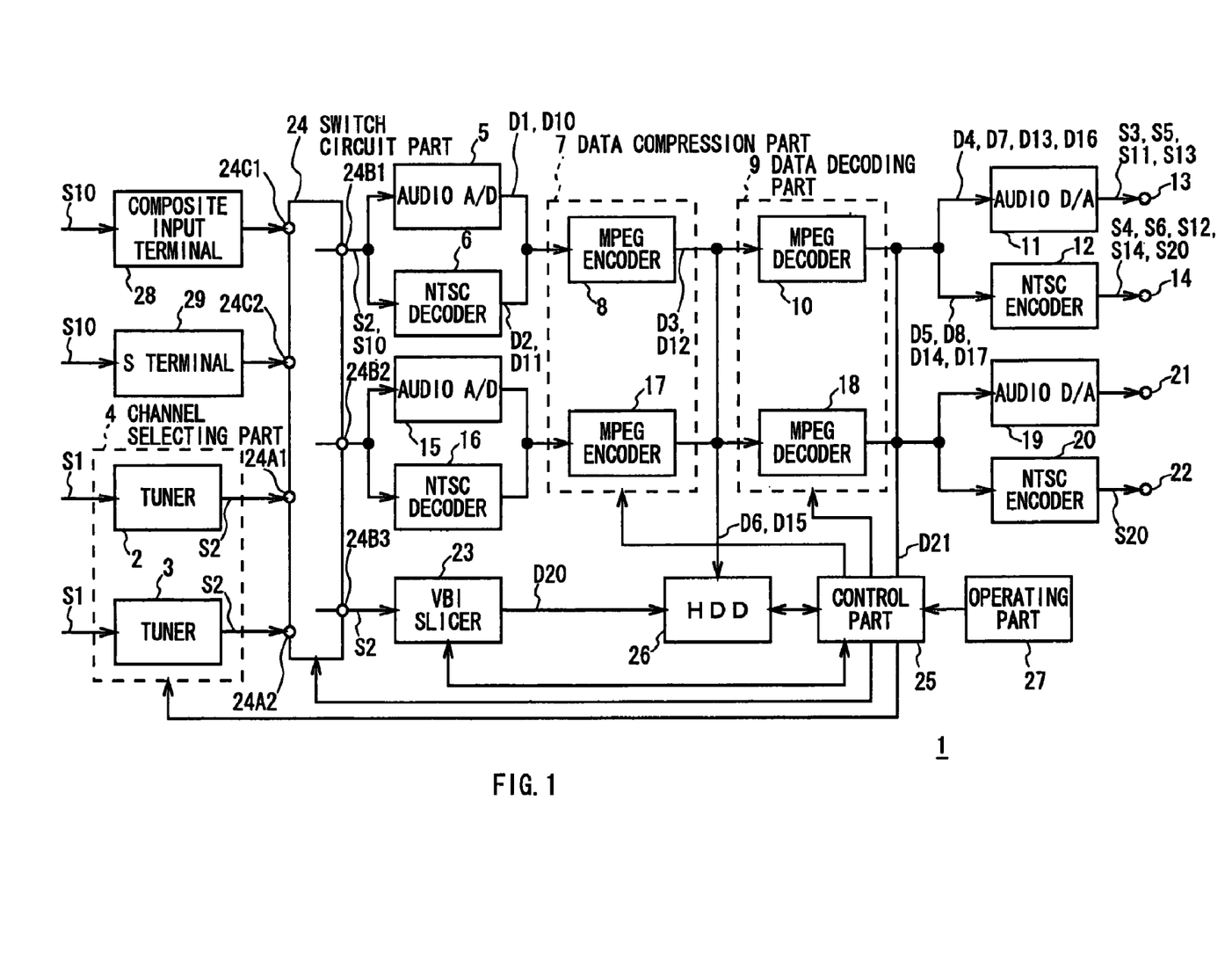
FIG. 1 is a block diagram showing an embodiment of the whole structure of a recording/reproducing apparatus according to the present invention.

Referring to FIG. 1, reference numeral 1 generally shows a recording/reproducing apparatus according to the present invention. A channel selecting part 4 having two tuners, a first and a second tuners 2 and 3 having similar configurations for taking in an analog television signal group S1 on plural channels supplied from the outside are provided in the input stage.

In a stage following the channel selecting part 4, a first signal processing system which is composed of a first audio analog-to-digital conversion circuit (hereinafter, this is referred to as "first audio A/D conversion circuit") 5, a first NTSC (national television system committee) decoder 6, a first MPEG (moving picture experts group) encoder 8 in a data compression part 7, a first MPEG decoder 10 in a data decoding part 9, a first audio digital-to-analog conversion circuit (hereinafter, this is referred to as "first audio D/A conversion circuit") 11, a first NTSC encoder 12, a first audio output terminal 13, and a first video output terminal 14, is provided.

In the stage following the channel selecting part 4, a second signal processing system which is composed of a second audio analog-to-digital conversion circuit (hereinafter, this is referred to as "second audio A/D conversion circuit") 15, a second NTSC decoder 16, a second MPEG encoder 17 in the data compression part 7, a second MPEG decoder 18 in the data decoding part 9, a second audio digital-to-analog conversion circuit (hereinafter, this is referred to as "second audio D/A conversion circuit") 19, a second NTSC encoder 20, a second audio output terminal 21, and a second video output terminal 22, in a similar configuration to the first signal processing system, is also provided.

Furthermore, in the stage following the channel selecting part 4, a vertical blanking interval slicer (hereinafter, this is referred to as "VBI slicer") 23 which separates an included video signal from a television signal S2 on a specified channel providing an electronic program guide, among plural channels (hereinafter, this is referred to as "program guide providing channel") and extracts the electronic program guide stored in a vertical blanking interval in the above separated video signal, is provided.

A switch circuit part 24 is provided between the channel selecting part 4 and the first and the second signal processing systems, the VBI slicer 23.

In the switch circuit part 24, the output terminal of the first tuner 2 in the channel selecting part 4 is connected to a first television signal input contact 24A1 on the signal input side, and the output terminal of the second tuner 3 in the channel selecting part 4 is connected to a second television signal input contact 24A2 on the signal input side.

In the switch circuit part 24, both of the input terminals of the first audio A/D conversion circuit 5 and the first NTSC decoder 6 provided in the first signal processing system, are connected to a first signal output contact 24B1 on the signal output side, and both of the input terminals of the second audio A/D conversion circuit 15 and the second NTSC decoder 16 provided in the second signal processing system, are connected to a second signal output contact 24B2 on the above signal input side. And the input terminal of the VBI slicer 23 is connected to a third signal output contact 24B3 on the signal input side.

In the switch circuit part 24, the first to the third signal output contacts 24B1 to 24B3 can be connected to either of the first and the second television signal input contacts 24A1 and 24A2.

Here, in the recording/reproducing apparatus 1, a control part 25 controls the channel selecting part 4, the data compression part 7, the data decoding part 9, the VBI slicer 23, and a hard disk drive for data recording and reproducing 26, according to various application programs previously stored in the internal memory, and at that time, the control part 25 also controls the connections of the first and the second television signal input contacts 24A1 and 24A2, and also the first to the third signal output contacts 24B1 to 24B3, to the switch circuit part 24. Thus, the viewing, recording, and reproducing of a desired television program can be executed.

That is, in the viewing of a television program, the control part 25 controls the channel selecting part 4, the data compression part 7, and the data decoding part 9, according to a viewing channel specifying command that will be entered via an operating part 27 being a remote controller or the like, and also controls the switch circuit part 24 to connect, for example, the first signal output contact 24B1 to the first television signal input contact 24A1.

Thereby, for example the first tuner 2 in the first and the second tuners 2 and 3 provided in the channel selecting part 4 selects the television signal S2 on a channel specified for viewing out of the analog television signal group S1 on plural channels supplied from the outside, and transmits the television signal S2 on the above selected channel, for example, to the first audio A/D conversion circuit 5 and the first NTSC decoder 6 in the first signal processing system, via the switch circuit part 24.

The first audio A/D conversion circuit 5 converts an analog audio signal included in the television signal S2 that was supplied from the first tuner 2 via the switch circuit part 24 into a digital signal, and transmits thus obtained digital audio data D1 to the first MPEG encoder 8.

The first NTSC decoder 6 converts an analog video signal included in the television signal S2 supplied from the first tuner 2 via the switch circuit part 24 into a digital signal, and transmits thus obtained digital video data D2 to the first MPEG encoder 8.

The first MPEG encoder 8 compressively codes the audio data D1 supplied from the first audio A/D conversion circuit 5 at a compression rate comparatively low according to the MPEG-1 audio layer two standard, and packets thus obtained compressively-coded audio data in a predetermined unit to generate compressed audio packet data.

Furthermore, the first MPEG encoder 8 compressively codes the video data D2 supplied from the first NTSC decoder 6 at a compression rate comparatively low according to the MPEG-2 standard, and packets thus obtained compressively-coded video data in a predetermined unit to generate compressed video packet data.

Then, the first MPEG encoder 8 performs time division multiplexing to the compressed audio packet data and the compressed video packet data, and transmits thus obtained stream data D3 (that is, packet data row) to the first MPEG decoder 10.

The first MPEG decoder 10 separates the stream data D3 supplied from the first MPEG encoder 8 into compressed audio packet data and compressed video packet data.

The first MPEG decoder 10 sequentially decodes the compressively-coded audio data in the predetermined unit stored in the compressed audio packet data separated from the stream data D3, according to a decoding method corresponding to the MPEG-1 audio layer two standard to generate audio data D4, and transmits the above generated audio data D4 to the first audio D/A conversion circuit 11.

Furthermore, the first MPEG decoder 10 sequentially decodes the compressively-coded video data in the predetermined unit stored in the compressed video packet data separated from the stream data D3, according to a decoding method corresponding to the MPEG-2 standard to generate video data D5, and transmits the above generated video data D5 to the first NTSC encoder 12.

The first audio D/A conversion circuit 11 converts the audio data D4 supplied from the first MPEG decoder 10 into an analog signal, and outputs thus obtained analog audio signal S3 from the first audio output terminal 13 to an external television set (not shown).

Furthermore, the first NTSC encoder 12 converts the video data D5 supplied from the first MPEG decoder 10 into an analog signal, and outputs thus obtained analog video signal S4 from the first video output terminal 14 to the external television set.

In this manner, the control part 25 enables the user to view the television program on the channel specified by the user (that is, the television program formed by the sound based on the audio signal S3 and the video based on the video signal S4).

When the control part 25 makes the user view a television program as the above, the control part 25 temporarily compressively codes the audio data D1 and the video data D2 obtained based on the television signal S2, respectively. However, at that time, they are compressively coded at a compression rate comparatively low, according to a bit rate comparatively high (for example, 9 [Mbps]) previously set to the stream data D3. Thereby, deterioration of the sound and video of the television program can be vastly reduced.

On the other hand, in the recording of a television program, the control part 25 controls the channel selecting part 4, the data compression part 7, and the hard disk drive 26, according to a recording channel specifying command entered via the operating part 27, and also controls the switch circuit part 24 to connect, for example, the first signal output contact 24B1 to the first television signal input contact 24A1.

In this case, for example the first tuner 2 in the channel selecting part 4 selects the television signal S2 on the channel specified for recording out of the television signal group S1 supplied from the outside, and transmits the television signal S2 on the above selected channel, for example, to the first audio A/D conversion circuit 5 and the first NTSC decoder 6 in the first signal processing system, via the switch circuit part 24.

The first audio A/D conversion circuit 5 converts the analog audio signal included in the television signal S2 supplied from the first tuner 2 via the switch circuit part 24 into a digital signal, similarly to the above case of viewing the television program, and transmits thus obtained digital audio data D1 to the first. MPEG encoder 8.

Also the first NTSC decoder 6 converts the analog video signal included in the television signal S2 supplied from the first tuner 2 via the switch circuit part 24 into a digital signal, similarly to the above case of viewing the television program, and transmits thus obtained digital video data D2 to the first MPEG encoder 8.

The first MPEG encoder 8 compressively codes the audio data D1 supplied from the first audio A/D conversion circuit 5 at a compression rate comparatively high according to the MPEG-1 audio layer two standard, and packets thus obtained compressively-coded audio data in a predetermined unit to generate compressed audio packet data.

Furthermore, the first MPEG encoder 8 compressively codes the video data D2 supplied from the first NTSC decoder 6 at a compression rate comparatively high according to the MPEG-2 standard, and packets thus obtained compressively-coded video data in a predetermined unit to generate compressed video packet data.

Then, the first MPEG encoder 8 performs time division multiplexing to the compressed audio packet data and the compressed video packet data, and transmits thus obtained stream data D6 (that is, packet data row) to the hard disk drive 26 to record the above stream data D6 on the hard disk.

Thus, the control part 25 can record the television program on the channel specified by the user as the stream data D6.

When in recording a television program as the above, the control part 25 compressively codes the audio data D1 and the video data D2 obtained based on the television signal S2, at a compression rate comparatively high according to the predetermined bit rate comparatively low (for example, 3 [Mbps]) previously set to the stream data D6, respectively, in order to reduce data quantity. Thereby, recording capacity on the hard disk can be effectively used, and many television programs can be recorded.

Then, when in reproducing the recorded television program, the control part 25 controls the hard disk drive 26 and the data decoding part 9, according to a television program specifying and reproducing command entered via the operating part 27, to reproduce the stream data D6 corresponding to the specified television program from the hard disk in the above hard disk drive 26, and transmits the above reproduced stream data D6, for example, to the first MPEG decoder 10 in the first signal processing system.

The first MPEG decoder 10 separates the stream data D6 supplied from the hard disk drive 26 into compressed audio packet data and compressed video packet data.

The first MPEG decoder 10 sequentially decodes the compressively-coded audio data in the predetermined unit stored in the compressed audio packet data separated from the stream data D6, according to the decoding method corresponding to the MPEG-1 audio layer two standard to generate audio data D7, and transmits the above generated audio data D7 to the first audio D/A conversion circuit 11.

Furthermore, the first MPEG decoder 10 sequentially decodes the compressively-coded video data in the predetermined unit stored in the compressed video packet data separated from the stream data D6, according to the decoding method corresponding to the MPEG-2 standard to generate video data D8, and transmits the above generated video data D8 to the first NTSC encoder 12.

The first audio D/A conversion circuit 11 converts the audio data D7 supplied from the first MPEG decoder 10 into an analog signal, and outputs thus obtained analog audio signal S5 from the first audio output terminal 13 to the external television set.

Furthermore, the first NTSC encoder 12 converts the video data D8 supplied from the first MPEG decoder 10 into an analog signal, and outputs thus obtained analog video signal S6 from the first video output terminal 14 to the external television set.

In this manner, the control part 25 enables the user to view the television program temporarily recorded (that is, the television program formed by the sound based on the audio signal S5 and the video based on the video signal S6).

In addition to this, in the input stage (that is, the stage previous to the switch circuit part 24), a composite input terminal 28 and an S terminal 29 which take in an analog external input signal S10 supplied from external equipment such as a video camera (not shown) according to its format, are provided.

In this case, in the switch circuit part 24, the output terminal of the composite input terminal 28 is connected to a first external signal input contact 24C1 on the signal input side, and the output terminal of the S terminal 29 is connected to a second external signal input contact 24C2 on the signal input side.

In the switch circuit part 24, either of the first and the second signal output contacts 24B1 and 24B2 can be connected to these first and second external signal input contacts 24C1 and 24C2.

Thereby, in the above recording/reproducing apparatus 1, also processing to the external input signal S10 supplied from the outside will be performed similarly to the above case of the television signal S2. Thus, the user can view the video and sound based on the above external input signal S10, and at the same time, the external input signal S10 can be recorded and reproduced with the hard disk of the hard disk drive 26.

Practically, if a viewing command of external input is entered via the operating part 27, the control part 25 controls the data compression part 7 and the data decoding part 9 according to this, and also controls the connections of the first and the second external signal input contacts 24C1 and 24C2 and the first and the second signal output contacts 24B1 and 24B2 to the switch circuit part 24.

Thereby, the external input signal S10 supplied from the external equipment is inputted to the composite input terminal 28 or the S terminal 29 according to its format, and is transmitted, for example, to the first audio A/D conversion circuit 5 and the first NTSC decoder 6 in the first signal processing system, via the switch circuit part 24.

In this case, the first audio A/D conversion circuit 5 converts an analog audio signal included in the external input signal S10 that was supplied from the composite input terminal 28 or the S terminal 29 via the switch circuit part 24 into a digital signal, and transmits thus obtained digital audio data D10 to the first MPEG encoder 8.

The first NTSC decoder 6 converts an analog video signal included in the external input signal S10 supplied from the composite input terminal 28 or the S terminal 29 via the switch circuit part 24 into a digital signal, and transmits thus obtained digital video data D11 to the first MPEG encoder 8.

Similarly to the case of viewing a television program, the first MPEG encoder 8 compressively codes the audio data D10 supplied from the first audio A/D conversion circuit 5 and the video data D11 from the first NTSC decoder 6 at the compression rate comparatively low, respectively, performs time division multiplexing to thus obtained compressed audio packet data and compressed video packet data to generate stream data D12, and transmits this to the first MPEG decoder 10.

Similarly to the above case of viewing the television program, also the first MPEG decoder 10 separates the stream data D12 supplied from the first MPEG encoder 8 into compressed audio packet data and compressed video packet data, and decodes them respectively to generate audio data D13 and video data D14. The above audio data D13 is converted into an analog signal in the first audio D/A conversion circuit 11, and thus obtained audio signal S11 is outputted from the first audio output terminal 13 to the television set. And the video data D14 is converted into an analog signal in the first NTSC encoder 12, and thus obtained video signal S12 is outputted from the first video output terminal 14 to the television set.

In this manner, the control part 25 enables the user to view the video and listen to the sound based on the external input signal S10 supplied from external equipment via a television set.

When the control part 25 makes the user view video and listen to sound supplied from external equipment as the above, the control part 25 temporarily compressively codes the audio data D10 and the video data D11 obtained based on the external input signal S10, respectively. However, at that time, they are compressively coded at a compression rate comparatively low according to the predetermined bit rate comparatively high (for example, 9 [Mbps]) previously set to the stream data D12. Thereby, deterioration of the above video and sound can be vastly reduced.

On the other hand, if an external input recording command is entered via the operating part 27, the control part 25 controls the switch circuit part 24, the data compression part 7, and the hard disk drive 26, according to this.

In this case, the external input signal S10 supplied from the external equipment is inputted to the composite input terminal 28 or the S terminal 29, and is transmitted to the first MPEG encoder 8 sequentially via the switch circuit part 24 and, for example, the first audio A/D conversion circuit 5 and the first NTSC decoder 6 in the first signal processing system, as digital audio data D10 and video data D11.

Similarly to the case of recording the television program, the first MPEG encoder 8 compressively codes the audio data D10 and the video data D11 at the compression rate comparatively high, respectively, performs time division multiplexing to thus obtained compressed audio packet data and compressed video packet data to generate stream data D15, and transmits this to the hard disk drive 26 to record the above stream data D15 on the hard disk.

In this manner, the control part 25 can record the external input signal S10 supplied from the external equipment as the stream data D15.

When in recording the external input signal S10 as the above, the control part 25 compressively codes the audio data D10 and video data D11 obtained based on the above external input signal S10, at the compression rate comparatively high according to the predetermined bit rate comparatively low (for example, 3 [Mbps]) previously set to the stream data D15, respectively, in order to reduce data quantity. Thereby, the recording area on the hard disk can be effectively used, and a lot of external input can be recorded.

Then, when in reproducing the recorded external input signal S10, the control part 25 controls the hard disk drive 26 and the data decoding part 9, according to the specifying and reproducing command of the external input signal S10 being the reproducing object entered via the operating part 27, to reproduce the stream data D15 corresponding to the specified external input signal S10 from the hard disk in the above hard disk drive 26, and transmits the above reproduced stream data D15, for example, to the first MPEG decoder 10 in the first signal processing system.

Similarly to the above case of reproducing the television program, the first MPEG decoder 10 separates the stream data D15 supplied from the hard disk drive 26 into compressed audio packet data and compressed video packet data, and decodes them respectively to generate audio data D16 and video data D17. The above audio data D16 is converted into an analog signal in the first audio D/A conversion circuit 11, and thus obtained audio signal S13 is outputted to the television set from the first audio output terminal 13. And the video data D17 is converted into an analog signal in the first NTSC encoder 12, and thus obtained video signal S14 is outputted to the television set from the first video output terminal 14.

In this manner, the control part 25 enables the user to view the video and listen to the sound based on the external input signal S10 supplied from the external equipment and temporarily recorded, via a television set.

In this connection, the viewing, and the recording and reproducing of the television program has described in the above as the processing by the first tuner 2 and the first signal processing system respectively, however, similar processing can be performed by the combinations of the second tuner 3 and the second signal processing, the first tuner 2 and the second signal processing system, and the second tuner 3 and the first signal processing system.

Furthermore, also the viewing of the video and sound based on the external input signal S10 and the recording and reproducing of the above external input signal S10 has described as the processing by the first signal processing system, however, similar processing can be performed also by the second signal processing system.

By the way, in the program guide providing channel, an electronic program guide and the information on the providing time and date of the next electronic program guide (hereinafter, this is referred to as "providing time and date information") are stored, in the vertical blanking period of a video signal included in the television signal S2 on the above program guide providing channel, at a predetermined timing of few times a day.

Figure 2:
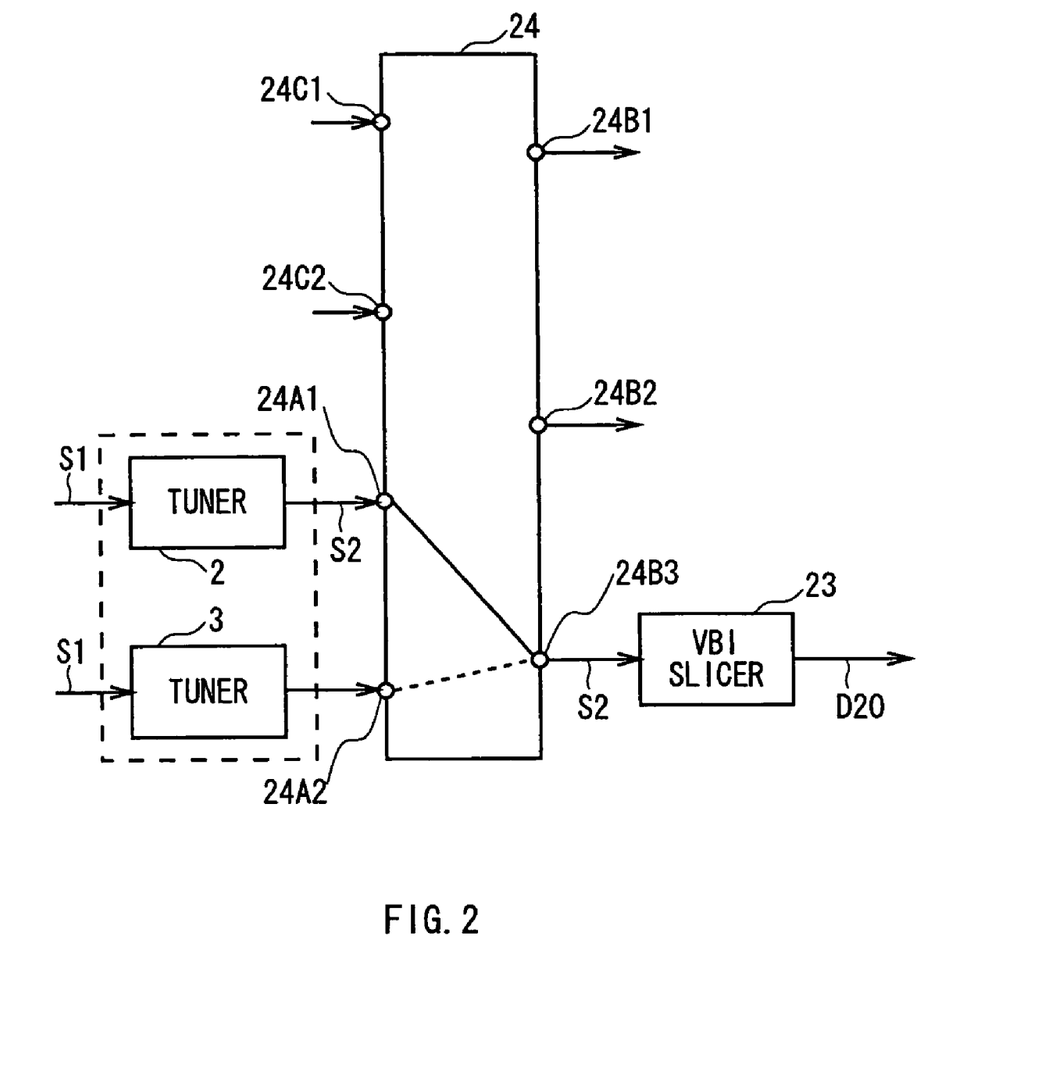
FIG. 2 is a block diagram for explaining the obtaining of an electronic program guide.

When power is supplied from commercial power supply or the like to the recording/reproducing apparatus 1, the recording/reproducing apparatus 1 does not know the providing time and date of the electronic program guide at that time. Therefore, as shown in FIG. 2, the control part 25 controls the switch circuit part 24 to connect the third signal output contact 24B3 to either of the first and the second television signal input contacts 24A1 and 24A2. And the control part 25 controls one of the first and the second tuners 2 and 3 that has been connected via the third signal output contact 24B3 and the first or the second television signal input contact 24A1 or 24A2 to select the program guide providing channel.

Thereby, that first or second tuner 2 or 3 selects the television signal S2 on the program guide providing channel out of the television signal group S1 on plural channels, that will be supplied from the outside at all times, and transmits the television signal S2 on the above selected program guide providing channel to the VBI slicer 23 via the switch circuit part 24.

The VBI slicer 23 works under the control of the control part 25. The VBI slicer 23 separates an included video signal from the television signal S2 on the program guide providing channel, supplied from the first or the second tuner 2 or 3 via the switch circuit part 24, and detects whether or not the electronic program guide and the providing time and date information have been stored in the vertical blanking period in the above video signal. In this manner, the control part 25 awaits that the television signal S2 including such video signal is provided.

When the VBI slicer 23 is awaiting the providing of the electronic program guide, if that the electronic program guide and the providing time and date information have been stored in the vertical blanking period in the video signal is detected, the VBI slicer 23 extracts the electronic program guide and the providing time and date information stored in the vertical blanking period from that video signal, and transmits the above extracted electronic program guide to the hard disk drive 26 as electronic program guide data D20 to record this on the hard disk, and also transmits the providing time and date information similarly extracted to the control part 25.

If the providing time and date information is supplied from the VBI slicer 23, the control part 25 recognizes that the electronic program guide was extracted according to this. As a result, the control part 25 releases the control for extraction of electronic program guide of the switch circuit part 24, the first or the second tuner 2 or 3, and the VBI slicer 23, to make the switch circuit part 24 and the channel selecting part 4 usable for the aforementioned viewing of the television program or the like.

In this manner, if the control part 25 awaits providing of an electronic program guide from the starting of the recording/reproducing apparatus 1 and obtains the first providing time and date information, the control part 25 stores this in the internal memory, and compares the present time and date timed by a RTC (real time clock) circuit provided in the above control part 25 to the providing time and date shown by the providing time and date information. In this manner, the control part 25 awaits the next providing of an electronic program guide.

If the present time and date reaches the providing time and date, the control part 25 controls one of the first and the second tuners 2 and 3 that is in the waiting state selectable the program guide providing channel at the time to select the program guide providing channel, and also controls the switch circuit part 24 to connect that first or second tuner 2 or 3 to the VBI slicer 23.

The VBI slicer 23 again extracts the electronic program guide and the providing time and date information in the vertical blanking period from the video signal included in the television signal S2 on the program guide providing channel, and transmits the above extracted electronic program guide to the hard disk drive 26 as electronic program guide data D20 to record it on the hard disk by overwriting on the former electronic program guide, and also similarly transmits the extracted providing time and date information extracted to the control part 25.

If the providing time and date information is supplied from the VBI slicer 23, the control part 25 recognizes that the electronic program guide was extracted by this, and releases the control for extraction of electronic program guide of the switch circuit part 24, the first or the second tuner 2 or 3, and the VBI slicer 23, to make the switch circuit part 24 and the channel selecting part 4 usable for the aforementioned viewing of the television program or the like. Also, the control part 25 makes the internal memory store the above providing time and date information by overwriting on the former providing time and date, and again awaits the next providing of an electronic program guide.

In this manner, if the control part 25 once obtains an electronic program guide and providing time and date information, thereafter, the control part 25 can sequentially obtain a new electronic program guide, according to the providing time and date information provided along with the electronic program guide, as long as electric power is supplied to the recording/reproducing apparatus 1. Thereby, the recording/reproducing apparatus 1 can surely obtain an electronic program guide that will be provided based on the television signal S2 on the program guide providing channel few times a day.

In this connection, if an electronic program guide read request is entered via the operating part 27 in the state where the electronic program guide was obtained, the control part 25 reads out the electronic program guide from the hard disk of the hard disk drive 26.

Then, the control part 25 performs predetermined graphics processing to the electronic program guide, and transmits thus obtained digital electronic program guide screen data D21 to the first or the second NTSC encoder 12 or 20. In the above first or second NTSC encoder 12 or 20, the electronic program guide screen data D21 is converted into an analog signal, and thus obtained analog electronic program guide screen signal S20 is outputted to the external television set from the first or the second video output terminal 14 or 22.

In this manner, the control part 25 enables the user to see an electronic program guide screen based on the electronic program guide screen signal S20 via the external television set.

In this state, the control part 25 properly updates the configuration of the electronic program guide screen data D21 according to the operation of the operating part 27, converts this into an electronic program guide screen signal S20 via the first or the second NTSC encoder 12 or 20, and outputs this to the television set from the first or the second video output terminal 14 or 22. Thus, the control part 25 enables the user select for example a desired television program to reserve its recording, by moving a cursor or the like on the electronic program guide screen.

Then, if the television program to be reserved its recording is selected on the electronic program guide screen, the control part 25 generates recording reservation data according to this, and records it into the internal memory. Thereby, if the starting time of the recording reservation comes after that, the television program previously selected is recorded according to that recording reservation data.

Figure 3:
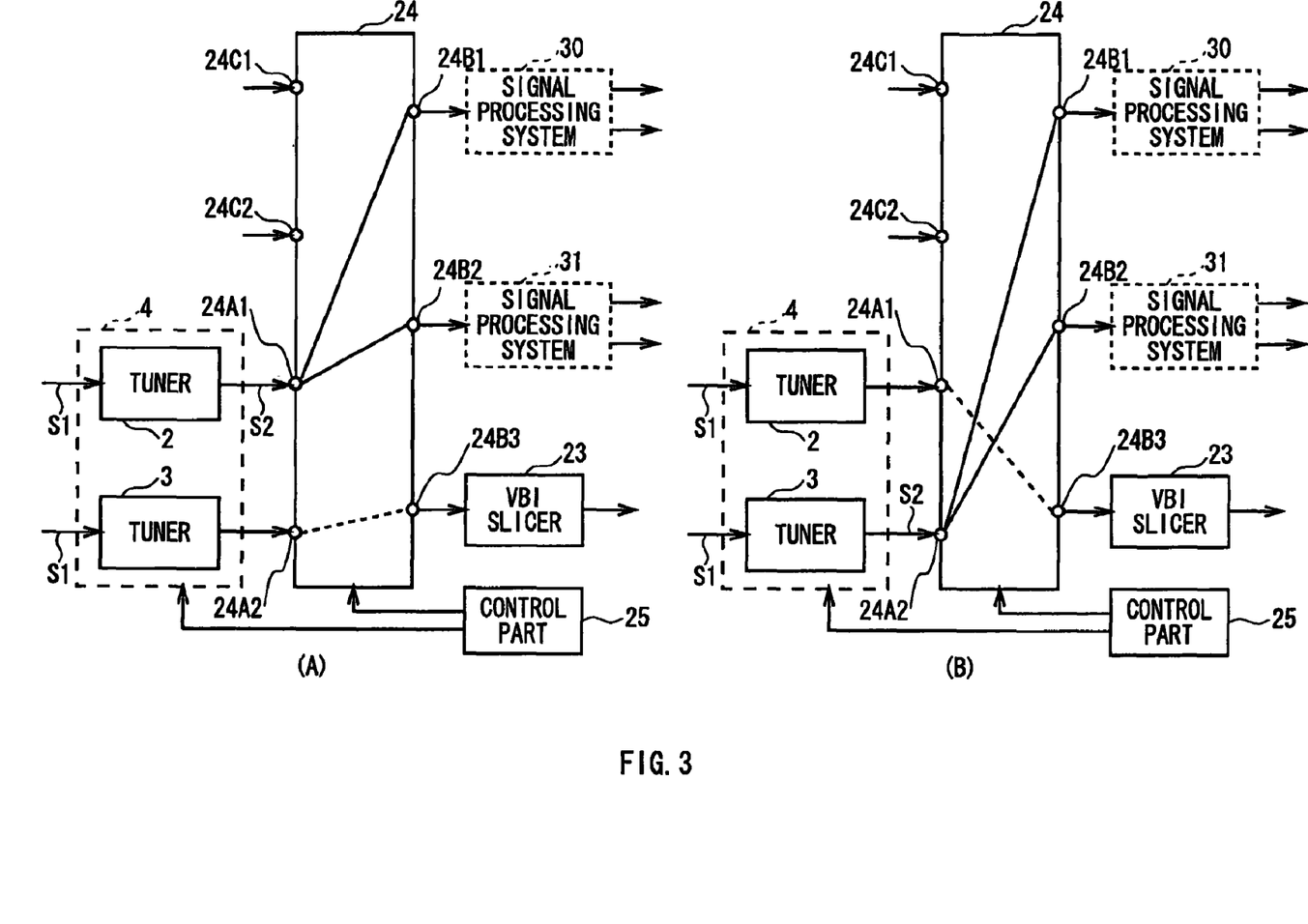
FIG. 3 are block diagrams for explaining the control of a switch circuit part in the case where plural different processing is simultaneously performed to one television signal.

By the way, as shown in FIGS. 3(A) and 3(B), the control part 25 can connect both of the first and the second signal output contacts 24B1 and 24B2 to the first television signal input contact 24A1, and also can connect both of the above first and second signal output contacts 24B1 and 24B2 connect to the second television signal input contact 24A2, by controlling the switch circuit part 24.

When the control part 25 connected both of the first and the second signal output contacts 24B1 and 24B2 to one of the output terminals of the first and the second tuners 2 and 3 by controlling the switch circuit part 24, the control part 25 controls the first or the second tuner 2 or 3 that have been connected to the both of the first and the second signal processing systems 30 and 31 via the above switch circuit part 24 to select a desired channel.

Thereby, the television signal S2 on the above one channel selected by the first or the second tuner 2 or 3 can be transmitted to the first audio A/D conversion circuit 5 and the first NTSC decoder 6 in the first signal processing system 30 via the switch circuit part 24, and it also can be transmitted to the second audio A/D conversion circuit 15 and the second NTSC decoder 16 in the second signal processing system 31, by the control part 25.

When the control part 25 connected both of the first and the second signal processing systems 30 and 31 to one of the first and the second tuners 2 and 3 via the switch circuit part 24, the aforementioned processing for viewing the television program is performed to the television signal S2 in either one of the first and the second signal processing systems 30 and 31, and at the same time, the aforementioned processing for recording the television program is performed to the television signal S2 in the other one of the first and the second signal processing systems 30 and 31. Thus, the desired one television program can be viewed and recorded at the same time.

Since the first and the second MPEG encoders 8 and 17 are provided in both of the first and the second signal processing systems 30 and 31 respectively, when the control part 25 connected both of the first and the second signal processing systems 30 and 31 to one of the first and the second tuners 2 and 3 via the switch circuit part 24, the television signal S2 is compressively coded in either one of the first and the second signal processing systems 30 and 31, for example at a comparatively low compression rate, and thus obtained stream data D3 is recorded on the hard disk of the hard disk drive 26, and also the television signal S2 is compressively coded in the other first or second signal processing system 30 or 31, for example at a comparatively high compression rate, and thus obtained stream data D6 is recorded on the hard disk in the hard disk drive 26. In this manner, the television signal S2 corresponding to a desired one television program can be simultaneously compressively coded at different compression rates, and they can be recorded on the hard disk.

In this manner, the control part 25 can collectively connect both of the first and the second signal output contacts 24B1 and 24B2 to either of the first and the second television signal input contacts 24A1 and 24A2 of the switch circuit part 24. Thereby, even in the case where a desired television program is viewed and recorded at the same time, and the case where a television signal S2 corresponding to a desired television program is simultaneously compressively coded at different compression rates and they are recorded, one of the first and the second tuners 2 and 3 can be surely freely used to keep it for selecting a program guide providing channel. Thus, an electronic program guide can be certainly obtained from the television signal S2 on the program guide providing channel.

In this connection, after the control part 25 recorded two types of stream data D3 and D6 obtained by simultaneously performing the processing for recording at different compression rates to one television signal S2, if a reproducing command of the television program corresponding to the above two types of stream data D3 and D6 is entered via the operating part 27, the control part 25 reproduces one stream data D3 obtained by that the television signal S2 was compressively coded at a comparatively low compression rate (that is, the lower compression rate in the different compression rates to the television signal S2) in the two types of stream data D3 and D6 from the hard disk in the hard disk drive 26, and performs similar processing to the aforementioned reproducing of the television program to the above reproduced stream data D3. And the user views the television program corresponding to the stream data D3.

Furthermore, after the control part 25 recorded the two types of stream data D3 and D6 obtained by simultaneously performing the processing for recording to one television signal S2 at the different compression rates on the hard disk, if a longtime save command for storing the television program corresponding to the above two types of stream data D3 and D6 for a long time is entered via the operating part 27, the control part 25 saves one stream data D6 obtained by that the television signal S2 was compressively coded at a compressively high compression rate (that is, the higher compression rate in the different compression rates to the television signal S2) in the two types of stream data D3 and D6 on the hard disk of the hard disk drive 26, and deletes the other stream data D3 (that is, stream data D3 obtained by that the television signal S2 was compressively coded at the comparatively low compression rate).

The control part 25 records a desired television program, and in its reproducing, the control part 25 reproduces only stream data D3 generated with a comparatively low compression rate, so that the user can view the television program with clear pictures in that there is almost no deterioration by compressive coding. Furthermore, in the longtime saving of the television program, the control part 25 saves only stream data D6 generated with reducing the data quantity by the use of the comparatively high compression rate, so that the recording capacity of the hard disk can be effectively used, and many television programs can be recorded on the hard disk.

Figure 4:
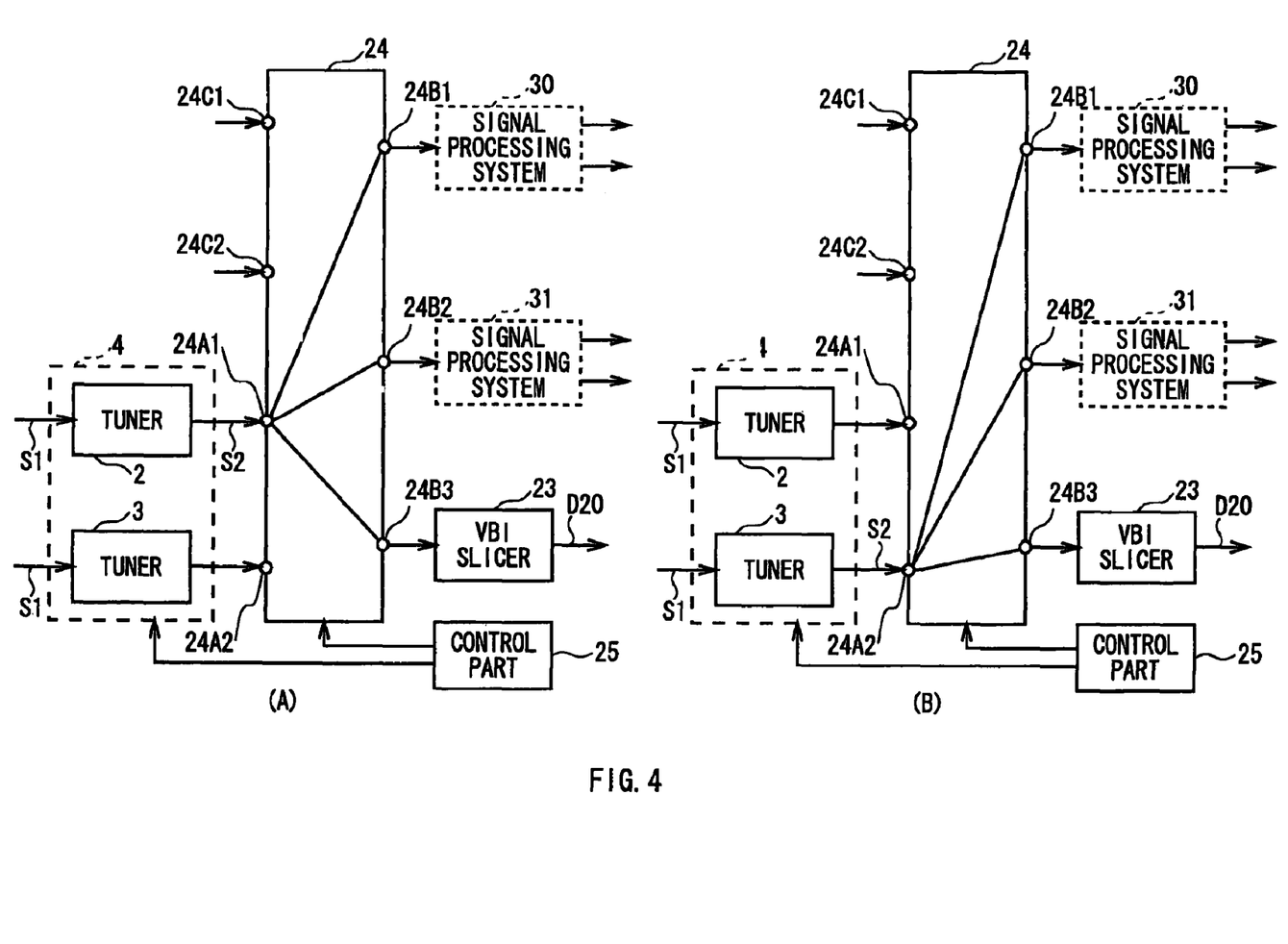
FIG. 4 are block diagrams for explaining the obtaining of an electronic program guide in the case where plural different processing is simultaneously performed to a television signal on a program guide providing channel.

In addition to this, as shown in FIGS. 4(A) and 4(B), when one of the first and the second tuners 2 and 3 has been connected to both of the first and the second signal processing systems 30 and 31 via the switch circuit part 24 and plural different processing (viewing and recording, or compressive coding at different compression rates) has been simultaneously performed to the television signal S2 on the program guide providing channel, if the present time reaches the providing time and date of an electronic program guide, the control part 25 controls the above switch circuit part 24 to connect the third signal output contact 24B3 to the first or the second television signal input contact 24A1 or 24A2 connected to the output terminal of the first or the second tuner 2 or 3 that is selecting the program guide providing channel, so that the television signal S2 on the above program guide providing channel is also taken in the VBI slicer 23 from the first or the second tuner 2 or 3 via the switch circuit part 24.

Thereby, the control part 25 can extract the electronic program guide and providing time and date information in the vertical blanking period from a video signal included in the television signal S2 on the program guide providing channel, while selecting the television signal S2 on the program guide providing channel only by one of the first and the second tuners 2 and 3, and simultaneously executing the plural different processing on the above television signal S2 in the first and the second signal processing systems 30 and 31.

Here, practically, if a start command of the recording/reproducing apparatus 1 is entered via the operating part 27, the control part 25 activates the recording/reproducing apparatus 1 according to this, and reads a simultaneous processing program for simultaneously performing plural different processing to one television signal S2 from the internal memory. The control part 25 enters into the procedure of simultaneous processing RT1 shown in FIG. 5 from the starting step, according to the above read simultaneous processing program, and proceeds to step SP1.

Figure 5:
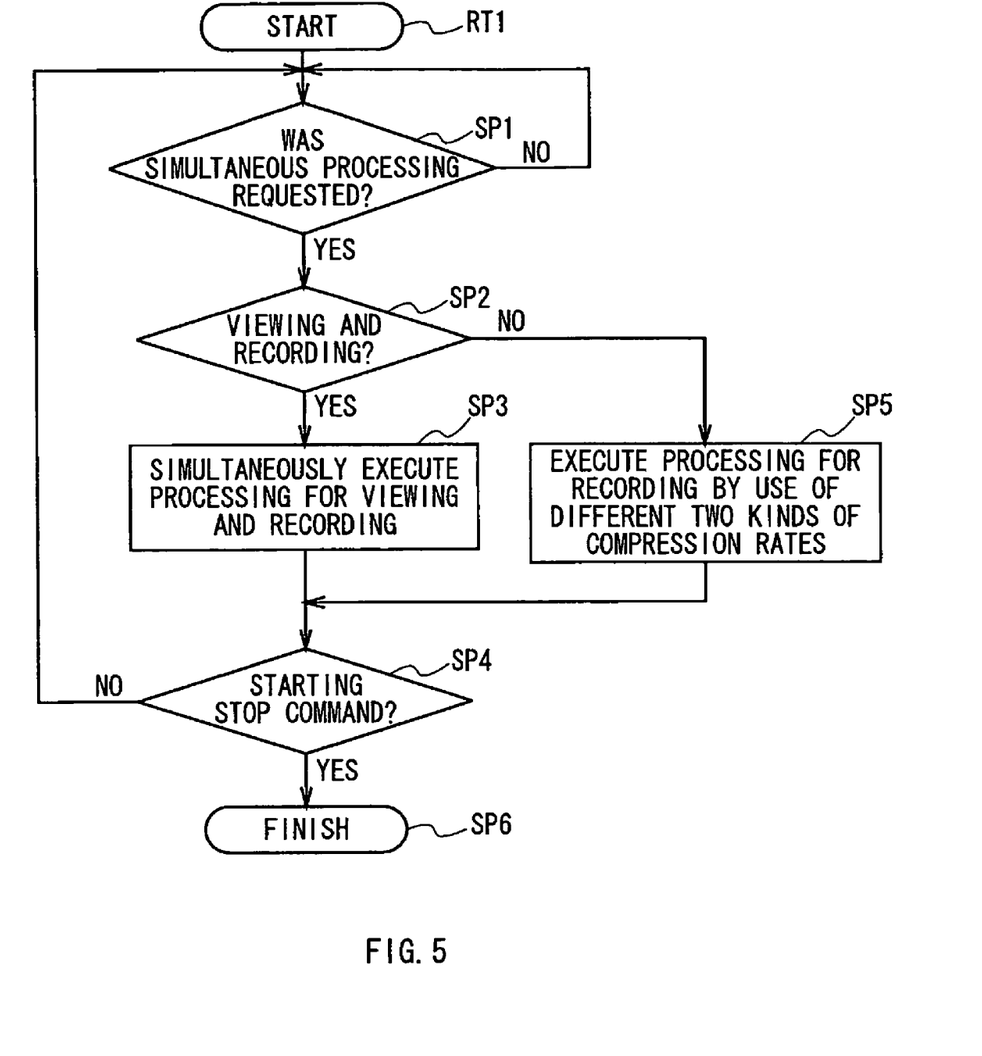
FIG. 5 is a flowchart showing the procedure of simultaneous processing.

In step SP1, the control part 25 awaits the input of a simultaneous processing request command of viewing and recording of one television program, compressive coding of a television signal S2 corresponding to one television program at different compression rates, or the like. If such simultaneous processing request command is entered via the operating part 27, the control part 25 proceeds to step SP2.

In step SP2, the control part 25 determines whether or not the requested simultaneous processing is viewing and recording of one television program.

If an affirmative result is obtained in this step SP2, this means that for example, as the simultaneous processing request command, a command to record a desired television program was entered via the operating part 27 when the television program is being viewed. At this time, the control part 25 proceeds to step SP3.

In step SP3, the control part 25 controls the switch circuit part 24 to connect the first and the second signal processing systems 30 and 31 to either one of the first and the second tuners 2 and 3.

The control part 25 controls that first or second tuner 2 or 3 collectively connected to the both of the first and the second signal processing systems 30 and 31 to select the desired channel.

In this manner, the television signal S2 on the channel selected by one of the first and the second tuners 2 and 3 is transmitted to both of the first and the second signal processing systems 30 and 31 via the switch circuit part 24. Thereby, the aforementioned processing for viewing and recording one television program is simultaneously executed in the above first and second signal processing systems 30 and 31 respectively. If the above processing is completed, the control part 25 proceeds to step SP4.

In step SP4, the control part 25 determines whether or not a start stop command of the recording/reproducing apparatus 1 was entered via the operating part 27. If a negative result is obtained from that the start stop command has not been entered yet and the recording/reproducing apparatus 1 continues working, the control part 25 returns to step SP1.

Besides, if a negative result is obtained in step SP2, this means that as the simultaneous processing request command, a recording command to compressively code the television signal S2 corresponding to one television program at different compression rates and record them was entered. At this time, the control part 25 proceeds to step SP5.

In step SP5, the control part 25 controls the switch circuit part 24 to connect the first and the second signal processing systems 30 and 31 to either one of the first and the second tuners 2 and 3.

The control part 25 controls that first or second tuner 2 or 3 that has been collectively connected to the both of the first and the second signal processing systems 30 and 31 to select the desired channel.

In this manner, the television signal S2 on the channel selected by one of the first and the second tuners 2 and 3 is transmitted to both of the first and the second signal processing systems 30 and 31 via the switch circuit part 24. Thereby, compressively coding processing is executed on one television signal S2 at different compression rates in the first and the second signal processing systems 30 and 31 respectively. If the above processing is completed, the control part 25 proceeds to step SP4.

If a negative result is obtained in step SP4, the control part 25 returns to step SP1.

After the execution of the processing of steps SP1-SP2-SP3-SP4-SP5, if the start stop command of the recording/reproducing apparatus 1 is entered via the operating part 27 and an affirmative result is obtained in step SP4, the control part 25 proceeds to step SP6 and finishes the procedure of simultaneous processing RT1.

On the other hand, if electric power is supplied from a commercial power supply or the like to the recording/reproducing apparatus 1, the control part 25 starts by the energy, and reads an electronic program guide obtaining processing program from the internal memory. The control part 25 enters into the procedure of electronic program guide obtaining processing RT2 shown in FIG. 6 from the starting step according to the above read electronic program guide obtaining processing program, and proceeds to the next step SP11.

Figure 6:
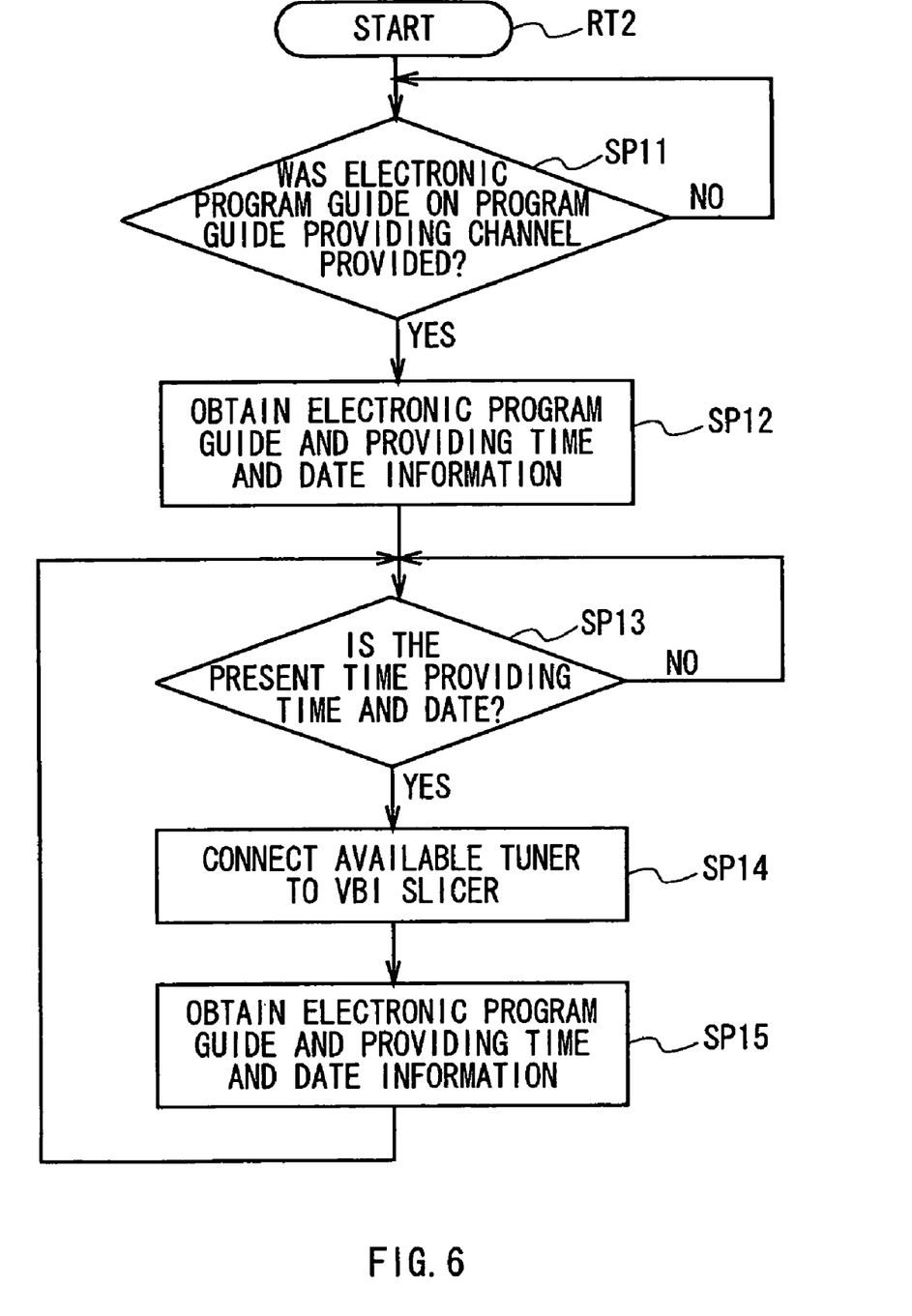
FIG. 6 is a flowchart showing a procedure for obtaining electronic program guide.

In step SP11, the control part 25 controls the switch circuit part 24 to connect either one of the first and the second tuners 2 and 3 to the VBI slicer 23, and controls the above connected first or second tuner 2 or 3 to select a program guide providing channel.

And then, the control part 25 awaits that the television signal S2 on the program guide providing channel selected by that first or second tuner 2 or 3 is transmitted to the VBI slicer 23 and an electronic program guide is provided by the television signal S2 on the above program guide providing channel.

If the electronic program guide is provided by the television signal S2 on the program guide providing channel, the control part 25 proceeds to step SP12.

In step SP12, the control part 25 makes the VBI slicer 23 extract the electronic program guide and providing time and date information in the vertical blanking period from a video signal included in the television signal S2 on the program guide providing channel, and records the above extracted electronic program guide on the hard disk of the hard disk drive 26 as electronic program guide data D20, and takes in the providing time and date information similarly extracted. And then, the control part 25 proceeds to step SP13.

In step SP13, the control part 25 awaits the next providing of an electronic program guide by comparing the present time to the providing time and date shown by the providing time and date information. If the present time reaches the providing time and date, the control part 25 proceeds to step SP14.

In step SP14, the control part 25 controls the switch circuit part 24 to connect one of the first and the second tuners 2 and 3 that can select the program guide providing channel to the VBI slicer 23, and controls the above connected first or second tuner 2 or 3 to select the program guide providing channel. Thereby, the television signal S2 on the program guide providing channel selected by that first or second tuner 2 or 3 is transmitted to the VBI slicer 23. And then, the control part 25 proceeds to step SP15.

In step SP15, the control part 25 makes the VBI slicer 23 extract the electronic program guide and the providing time and date information in the vertical blanking period from a video signal included in the television signal S2 on the program guide providing channel, and records the above extracted electronic program guide on the hard disk of the hard disk drive 26 as electronic program guide data D20, and takes in the providing time and date information similarly extracted. And then, the control part 25 returns to step SP13.

In this manner, during the period that electric power is supplied to the recording/reproducing apparatus 1, the control part 25 can certainly obtain an electronic program guide by the television signal S2 on the program guide providing channel few times a day.

Note that, in the case of this embodiment, the control part 25 controls the switch circuit part 24 to collectively connect both of the first and the second signal output contacts 24B1 and 24B2 to the first or the second external signal input contacts 24C1 or 24C2. Thus, both of the first and the second signal processing systems 30 and 31 can be collectively connected to the composite input terminal 28 or the S terminal 29.

Thereby, not only the execution of the aforementioned simultaneous processing to one television signal S2, the aforementioned processing for viewing and recording can be simultaneously performed to the external input signal S10 by the first and the second signal processing systems 30 and 31, and also the compressively coding processing at different compression rates can be simultaneously performed by the above first and second signal processing systems 30 and 31.

Furthermore, timing to execute the aforementioned compressively coding processing to one television signal S2 at different compression rates is not only limited to the time when the recording/reproducing apparatus 1 is being activated. By previously specifying the execution of compressively coding processing at different compression rates when in performing recording reservation of one television program with the electronic program guide, compressively coding processing can be performed to a television signal S2 corresponding to the television program being the object of the recording reservation at different compression rates when the recording of that television program is executed according to the recording reservation.

According to the above configuration, in this recording/reproducing apparatus 1, in the case where the simultaneous execution of plural different processing on one television program was requested, the control part 25 controls the switch circuit part 24 to collectively connect both of the first and the second signal processing systems 30 and 31 to either one of the first and the second tuners 2 and 3.

In the recording/reproducing apparatus 1, the control part 25 controls that first or second tuner 2 or 3 connected to the first and the second signal processing systems 30 and 31 to select the channel for one television signal S2 being a processing object, and transmits the television signal S2 on the selected channel from the above first or second tuner 2 or 3 to the both of the first and the second signal processing systems 30 and 31 via the switch circuit part 24. In this manner, the first and the second signal processing systems 30 and 31 perform the different processing to one television signal S2 respectively.

Therefore, in the recording/reproducing apparatus 1, even in the case where plural different processing is simultaneously performed to one television signal S2, separately from one of the first and the second tuners 2 and 3 that selected a channel for that processing, the other one of the first and the second tuners 2 and 3 can be kept for obtaining an electronic program guide that will be provided by a television signal S2 on the program guide providing channel.

Consequently, in the recording/reproducing apparatus 1, even if the electronic program guide is provided by the television signal S2 on the program guide providing channel when plural different processing has been simultaneously performed to one television signal S2, the other first or second tuner 2 or 3 and the VBI slicer 23 are connected via the switch circuit part 24, and the electronic program guide in the vertical blanking period can be certainly obtained from a video signal included in the television signal S2 on the program guide providing channel by the above VBI slicer 23.

Furthermore, in the recording/reproducing apparatus 1, as plural different processing to one television signal S2, compressively coding processing at different compression rates will be simultaneously executed, so that two types of stream data D3 and D6 can be obtained and they can be recorded on a hard disk.

In the recording/reproducing apparatus 1, if reproducing of the stream data D3 and D6 recorded on the hard disk is requested, in the two types of stream data D3 and D6, the stream data D3 obtained by compressively coding the television signal S2 at a comparatively low compression rate is reproduced. If longtime saving of the stream data D3 and D6 is requested, in the two types of stream data D3 and D6, one stream data D6 obtained by compressively coding the television signal S2 at a comparatively high compression rate is saved in the hard disk, and the other stream data D3 is deleted.

Accordingly, in the recording/reproducing apparatus 1, in the case where reproducing of the stream data D3 and D6 recorded on the hard disk was requested, the user can view a television program with clear pictures in that there is almost no deterioration by compressively coding processing. On the other hand, in the case where longtime saving of the stream data D3 and D6 recorded on the hard disk was requested, in the above two types of stream data D3 and D6, only the stream data D6 in a less quantity corresponding to the compression rate is saved, so that the recording capacity of the hard disk can be effectively used, and many television programs can be recorded.

According to the above configuration, in the case where the simultaneous execution of plural different processing to one television program was requested, both of the first and the second signal processing systems 30 and 31 are collectively connected to either one of the first and the second tuners 2 and 3 by the switch circuit part 24, one television signal S2 on a channel selected by the above connected first or second tuner 2 or 3 is transmitted to both of the first and the second signal processing systems 30 and 31, and the different processing is executed on the television signal S2 respectively. Thereby, even in the case where plural different processing is simultaneously executed on one television signal S2 on a channel selected by one of the first and the second tuners 2 and 3, the other first or second tuner 2 or 3 can be kept for selecting a program guide providing channel, and that first or second tuner 2 or 3 is connected to the VBI slicer 23 via the switch circuit part 24, so that an electronic program guide in the vertical blanking period can be certainly obtained from a video signal included in the television signal S2 on the program guide providing channel. In this manner, a recording/reproducing apparatus that can certainly use an electronic program guide can be realized.

Note that, in the aforementioned embodiment, it has dealt with the case where if an electronic program guide is provided when plural different processing has been executed on the television signal S2 on the program guide providing channel, the VBI slicer 23 is connected to one of the first and the second tuners 2 and 3 that is selecting the program guide providing channel as well as the first and the second signal processing systems 30 and 31. However, the present invention is not only limited to this. If an electronic program guide is provided when plural different processing has been executed to the television signal S2 on the program guide providing channel, the VBI slicer 23 may be connected to the other first or second tuner 2 or 3 different from the first or second tuner 2 or 3 that has been connected to the first and the second signal processing systems 30 and 31.

In the aforementioned embodiment, it has dealt with the case where the procedure of simultaneous processing RT1 described above with FIG. 5 is executed according to the simultaneous processing program previously stored in the internal memory of the control part 25, and the procedure for obtaining electronic program guide RT2 described above with FIG. 6 is executed according to the electronic program guide obtaining processing program previously stored in the internal memory of the above control part 25. However, the present invention is not only limited to this. The procedure of simultaneous processing RT1 and the procedure for obtaining electronic program guide RT2 may be executed by installing a simultaneous processing program and an electronic program guide obtaining processing program in the recording/reproducing apparatus 1 by using cable or wireless communication media, such as a local area network, the Internet, and digital satellite broadcasting, or they may be executed by installing a program storage medium storing the above simultaneous processing program and electronic program guide obtaining processing program in the recording/reproducing apparatus 1.

In this connection, as such program storage medium for installing the simultaneous processing program and electronic program guide obtaining processing program into the recording/reproducing apparatus 1 to make the apparatus execute the processing procedure RT1 and electronic program guide obtaining processing procedure RT2, it is not only limited to package media, such as a flexible disk, a CD-ROM (compact disc read-only memory), and a DVD (digital video disc). The above storing may be realized by a semiconductor memory, a magnetic disk, or the like in that the simultaneous processing program and the electronic program guide obtaining processing program can be temporarily or permanently stored. Furthermore, as a means for storing the simultaneous processing program and the electronic program guide obtaining processing program in such program storage medium, a cable or wireless communication medium, such as a local area network, the Internet, and digital satellite broadcasting, may be used, and they may be stored via various communication interfaces, such as a router and a modem.

In the aforementioned embodiment, it has dealt with the case where a recording/reproducing apparatus according to the present invention is applied to the recording/reproducing apparatus 1 described above with FIGS. 1 to 6. However, the present invention is not only limited to this but also can be widely applied to various recording/reproducing apparatuses other than this, such as recording/reproducing apparatuses that use magneto-optical discs as recording media, computers, portable telephones and PDA (personal digital assistance), provided that a receiving function and processing function of television signals are provided.

In the aforementioned embodiment, it has dealt with the case where as at least two channel selecting mechanisms for taking in television signals on plural channels including a television signal on a program guide providing channel in that an electronic program guide has been stored at a predetermined timing, and selecting a television signal on a desired channel in the above plural channels, two tuners, the first and the second tuners 2 and 3 described above with FIGS. 1 to 6 are applied. However, the present invention is not only limited to this. More than two tuners may be applied.

In the aforementioned embodiment, it has dealt with the case where as at least two signal processing mechanisms for performing predetermined processing to a television signal on a desired channel selected by each channel selecting mechanism, the first and the second signal processing systems 30 and 31 described above with FIGS. 1 to 6 are applied. However, the present invention is not only limited to this. Various signal processing mechanisms other than this, such as more than one signal processing systems including a signal processing system for outputting a television signal to the outside without compressively coding or decoding can be widely applied.

In the aforementioned embodiment, it has dealt with the case where as a recording medium to record a television signal subjected to predetermined processing by each signal processing mechanism, the hard disk of the hard disk drive 26 described above with FIGS. 1 to 6 is applied. However, the present invention is not only limited to this. Various recording medium other than this, such as a magneto-optical disc and a semiconductor memory, can be widely applied.

In the aforementioned embodiment, it has dealt with the case where as electronic program extracting mechanism for extracting an electronic program guide from a television signal on a program guide providing channel selected by channel selecting mechanism, the VBI slicer 23 described above with FIGS. 1 to 6 is applied. However, the present invention is not only limited to this. As long as it can extract an electronic program guide from a television signal on a program guide providing channel selected by channel selecting mechanism, various electronic program guide extracting mechanisms other than this can be widely applied.

In the aforementioned embodiment, it has dealt with the case where as switching mechanism for switching connection to each channel selecting mechanism, each signal processing mechanism, and electronic program guide extracting mechanism, the switch circuit part 24 described above with FIGS. 1 to 6 is applied. However, the present invention is not only limited to this. Various switching mechanisms other than this, such as a switch circuit part that does not have contacts for a composite input terminal 28 and/or an S terminal 29 can be widely applied.

In the aforementioned embodiment, it has dealt with the case where as control mechanism, in the case where predetermined plural different processing is simultaneously performed to one television signal by each signal processing mechanism, for controlling switching mechanism so that the above each signal processing mechanism is collectively connected to one of the above plural channel selecting mechanisms, the control part 25 described above with FIGS. 1 to 6 is applied. However, the present invention is not only limited to this. Various control mechanisms other than this, such as a microprocessor composed of a COU (central processing unit), a RAM (random access memory), a ROM (read only memory), etc., and a simple CPU can be widely applied.

According to the present invention as described above, by at least two channel selecting mechanisms, television signals on plural channels including a television signal on a program guide providing channel, in that an electronic program guide has been stored at a predetermined timing are taken in, and a television signal on a desired channel is selected. By at least two signal processing mechanisms, predetermined processing is performed to the television signal on the desired channel selected by the channel selecting mechanism, and at the same time, by electronic program guide extracting mechanism, an electronic program guide is extracted from the television signal on the program guide providing channel selected by the channel selecting mechanism. When predetermined plural different processing is simultaneously performed to the above one television signal on the desired channel by the signal processing mechanism respectively, control mechanism controls switching mechanism for switching connection to each of the channel selecting mechanisms, each of the signal processing mechanisms, and the electronic program guide extracting mechanism to collectively connect the signal processing mechanism to one of the channel selecting mechanisms. Thereby, even in the case where predetermined plural different processing is simultaneously performed to one television signal, channel selecting mechanism for selecting the program guide providing channel can be kept, and the above kept channel selecting mechanism is connected to the electronic program guide extracting mechanism via the switching mechanism, so that an electronic program guide can be certainly obtained from a television signal on the program guide providing channel. Thus, a recording/reproducing apparatus that can certainly use an electronic program guide can be accomplished.

INDUSTRIAL APPLICABILITY

This invention is applied to a recording/reproducing apparatus such as a television receiver and a personal computers with a hard disk recorder, a DVD recorder or a recording function of television programs.

DESCRIPTION OF REFERENCE NUMERALS

1 . . . recording/reproducing apparatus, 2 . . . first tuner, 3 . . . second tuner, 8 . . . first MPEG encoder, 10 . . . first MPEG decoder, 17 . . . second MPEG encoder, 18 . . . second MPEG decoder, 23 . . . VBI slicer, 24 . . . switch circuit part, 25 . . . control part, 26 . . . hard disk drive, 30 . . . first signal processing system, 31 . . . second signal processing system, S1 . . . television signal group, S2 . . . television signal, D3, D6 . . . stream data, RT1 . . . procedure of simultaneous processing, RT2 . . . procedure for obtaining electronic program guide.

The invention claimed is:

1. A recording/reproducing apparatus, comprising:
at least two channel selecting mechanisms for taking in a plurality of television signals delivered over a plurality of channels including the television signal delivered over a program guide providing channel and in which an electronic program guide is stored at a predetermined timing, and for selecting the television signal delivered over a desired channel from among the plurality of channels;
at least two signal processing mechanisms for performing predetermined processing to said television signal delivered over said desired channel;
electronic program guide extracting mechanism for extracting said electronic program guide from said television signal delivered over said program guide providing channel;
switching mechanism for switching connections of said channel selecting mechanisms to output to one or more of said at least two signal processing mechanisms and said electronic program guide extracting mechanism; and
control mechanism for controlling said switching mechanism such that, in a first operating case, the signal processing mechanisms are each connected to one of said channel selecting mechanisms and the electronic program guide extracting mechanism is connected to another one of said channel selecting mechanisms so that (i) a plurality of predetermined different processing is simultaneously performed on said television signal on said desired channel by each of said signal processing mechanisms while (ii) said electronic program guide is obtained from said television signal by said electronic program guide extracting mechanism,
the at least two signal processing mechanisms simultaneously performing compressive coding processing to the television signal delivered over the desired channel such that each one of the at least two signal processing mechanisms performs compressive coding processing at a respective compression rate that is different than that at which any other of the at least two signal processing mechanisms performs compressive coding processing.

2. The recording/reproducing apparatus according to claim 1, wherein in a second case, said control mechanism controls said switching mechanism so that the at least two signal processing mechanisms and said electronic program guide extracting mechanism are collectively connected to only one of said plurality of channel selecting mechanisms.

3. The recording/reproducing apparatus according to claim 1, further comprising: a recording medium for storing said television signal subjected to said predetermined processing by said signal processing mechanisms, wherein said television signals compressively coded at the different compression rates are recorded in said recording medium.

4. The recording/reproducing apparatus according to claim 1, further comprising: a recording medium for storing said television signal subjected to said predetermined processing by each of said signal processing mechanisms, wherein said signal processing mechanisms simultaneously perform processing for viewing to said television signal carried over said desired channel, and said television signals subjected to the above compressive coding in the above processing for viewing are recorded in said recording medium.

5. A recording/reproducing apparatus, comprising:
two channel selecting mechanisms for taking in a plurality of television signals delivered over a plurality of channels including a program guide providing channel, and for selecting a television signal or signals therefrom from among the above plurality of television signals;
a first signal processing mechanism and a second signal processing mechanism for performing respective predetermined processing on a received television signal supplied thereto, the first signal processing mechanism performing a first predetermined processing and the second signal processing mechanism performing a second predetermined processing which is different than the first predetermined processing;
electronic program guide extracting mechanism for extracting said electronic program guide from said program guide providing channel;
switching mechanism for switching connections of said channel selecting mechanisms to output to one or more of the first and second signal processing mechanisms and said electronic program guide extracting mechanism; and
control mechanism for controlling said switching mechanism such that the first and second signal processing mechanisms are connected to a same one of said channel selecting mechanisms and the electronic program guide extracting mechanism is connected to another one of said channel selecting mechanisms so that (i) the first signal processing mechanism and the second signal processing mechanism receive a same one of said plurality of television signals and cause the first predetermined processing and the second predetermined processing to be simultaneously performed on that television signal while (ii) said electronic program guide is obtained from that television signal by said electronic program guide extracting mechanism,
said first predetermined processing including compressive coding at a first compression rate and said second predetermined processing including compressive coding at a second compression rate which is different than the first compression rate.

6. A recording/reproducing method, comprising:
- taking in, using two channel selecting mechanisms, a plurality of television signals delivered over a plurality of channels including the television signal delivered over a program guide providing channel and in which an electronic program guide is stored at a predetermined timing;
- selecting, using the two channel selecting mechanisms, the television signal delivered over a desired channel from among the above plurality of channels;
- performing, using at least two signal processing mechanisms, predetermined processing to said television signal delivered over said desired channel;
- extracting, using an electronic program guide extracting mechanism, said electronic program guide from said television signal delivered over said program guide providing channel;
- switching, using a switching mechanism, connections of said channel selecting mechanisms to output to one or more of said signal processing mechanisms and said electronic program guide extracting mechanism; and
- controlling said switching mechanism such that the signal processing mechanisms are each connected to one of said channel selecting mechanisms and the electronic program guide extracting mechanism is connected to another one of said channel selecting mechanisms so that (i) a plurality of predetermined different processing is simultaneously performed on the same said television signal on said desired channel by each of said signal processing mechanisms while (ii) said electronic program guide is obtained from said television signal by said electronic program guide extracting mechanism,
- the plurality of predetermined different processing including simultaneously performing compressive coding processing, to the television signal delivered over the desired channel, at respective compression rates that are different from each other.

* * * * *